(12) United States Patent
Koh et al.

(10) Patent No.: US 8,934,841 B2
(45) Date of Patent: Jan. 13, 2015

(54) BLUETOOTH COMMUNICATION METHOD AND SYSTEM

(75) Inventors: Myung Geun Koh, Yongin-si (KR); Yi Kyu Min, Yongin-si (KR); Kyung Goo Lee, Seoul (KR); Byoung Il Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 13/194,302

(22) Filed: Jul. 29, 2011

(65) Prior Publication Data

US 2012/0045994 A1 Feb. 23, 2012

(30) Foreign Application Priority Data

Aug. 19, 2010 (KR) ........................ 10-2010-0080325

(51) Int. Cl.
| | |
|---|---|
| *H04B 7/00* | (2006.01) |
| *H04W 76/02* | (2009.01) |
| *H04L 29/06* | (2006.01) |
| *H04W 12/00* | (2009.01) |
| *H04W 12/02* | (2009.01) |
| *H04W 84/18* | (2009.01) |

(52) U.S. Cl.
CPC ......... *H04W 76/023* (2013.01); *H04L 63/0492* (2013.01); *H04L 63/18* (2013.01); *H04W 12/00* (2013.01); *H04W 12/02* (2013.01); *H04W 84/18* (2013.01)
USPC .......................... 455/41.3; 455/41.1; 455/41.2

(58) Field of Classification Search
CPC ..................................................... H04W 12/06
USPC ................................................ 455/41.1–41.3
See application file for complete search history.

(56) References Cited

U.S. PATENT DOCUMENTS

| | | | | |
|---|---|---|---|---|
| 7,516,325 | B2 * | 4/2009 | Willey ........................... | 713/169 |
| 7,650,145 | B2 * | 1/2010 | Ukita et al. .................... | 455/420 |
| 7,715,793 | B2 * | 5/2010 | Fuccello et al. .............. | 455/41.2 |
| 2012/0086549 | A1 * | 4/2012 | Barnes, Jr. ................... | 340/5.61 |

FOREIGN PATENT DOCUMENTS

| | | |
|---|---|---|
| JP | 2004-363670 A | 12/2004 |
| KR | 10-0764687 B1 | 10/2007 |

* cited by examiner

*Primary Examiner* — Tuan H Nguyen
(74) *Attorney, Agent, or Firm* — Jefferson IP Law, LLP (57) ABSTRACT

A Bluetooth communication method and system for enabling one Bluetooth device to rapidly connect to another Bluetooth device using an audio signal, and also enabling them to transmit data to each other are provided. The system includes first and second Bluetooth devices. The first Bluetooth device transforms authentication information required to establish a Bluetooth communication connection into an audio signal, and broadcasts the audio signal. The second Bluetooth device receives the audio signal and extracts the authentication information from the received audio signal. The second Bluetooth device establishes a Bluetooth communication channel with the first Bluetooth device, using the extracted authentication information.

19 Claims, 5 Drawing Sheets

BLUETOOTH COMMUNICATION METHOD AND SYSTEM

PRIORITY

This application claims the benefit under 35 U.S.C. §119(a) of a Korean patent application filed on Aug. 19, 2010 in the Korean Intellectual Property Office and assigned Serial No. 10-2010-0080325, the entire disclosure of which is hereby incorporated by reference.

BACKGROUND OF THE INVENTION

1. Field of the Invention

The present invention relates to systems adapted to Bluetooth technology. More particularly, the present invention relates to a Bluetooth communication method and system that enables one Bluetooth device to rapidly connect to another Bluetooth device via Bluetooth communication, using an audio signal, and also enables them to transmit data to each other via Bluetooth communication.

2. Description of the Related Art

With the rapid development of information and communication technology and semiconductor technology, the use of various types of mobile devices has increased. Mobile devices employ mobile convergence to provide additional services provided by other types of mobile systems as well as their traditional services. For example, mobile devices include their usual communication functions such as a voice calling or a message transmission, and additional functions as well, such as a TV viewing function (e.g., mobile broadcasting, such as Digital Multimedia Broadcasting (DMB), Digital Video Broadcasting (DVB), etc.,), an audio playback function (e.g., MPEG Audio Layer 3 (MP3)), a photographing function, an Internet function, a short-range wireless communication function, etc.

Short-range wireless communication is a type of communication that enables computers, mobile devices, electric home appliances, etc., located in a relatively short range, to wirelessly connect to each other and enables them to perform bi-directional communication with each other. Examples of short-range wireless communication include ZigBee, Infrared communication, Bluetooth, etc. Bluetooth enables electronic devices to exchange data, such as voice data, etc., in a globally unlicensed Industrial, Scientific and Medical (ISM) 2.45 GHz short-range Radio Frequency (RF) band.

A device supporting a Bluetooth function, hereinafter called a Bluetooth device, must perform a pairing process to establish a communication channel with another Bluetooth device. That is, the Bluetooth device broadcasts an Inquiry Message to peripheral Bluetooth devices, via the Bluetooth antenna. When peripheral Bluetooth devices receive the Inquiry Message, they broadcast Inquiry Response Messages responding to the Inquiry Message to the Bluetooth device that broadcast the Inquiry Message, respectively. The Bluetooth device receives the Inquiry Response Messages from the peripheral Bluetooth devices. The Inquiry Response Message includes authentication information (e.g., the unique address of a Bluetooth device, (i.e., BD_ADDR)) required to establish a Bluetooth communication channel. After that, the Bluetooth device transmits a Name Request message to the searched peripheral Bluetooth devices and receives device names therefrom. The Bluetooth device displays the unique addresses and the device names of the searched peripheral Bluetooth devices on a display unit. When the user chooses one of the peripheral Bluetooth devices displayed on the display unit, the Bluetooth device establishes a Bluetooth communication channel with the selected Bluetooth device, and transmits data thereto. However, this conventional Bluetooth communication method is complicated, so the users feel inconvenienced. In addition, the conventional Bluetooth communication system is disadvantageous to enable a Bluetooth device to broadcast an Inquiry message for a certain period of time in order to search for peripheral Bluetooth devices, which requires a great deal of time to establish the connection of Bluetooth communication therebetween.

SUMMARY OF THE INVENTION

Aspects of the present invention are to address the above-mentioned problems and/or disadvantages and to provide at least the advantages described below. Accordingly, an aspect of the present invention is to provide a Bluetooth communication method and system that enables Bluetooth devices to rapidly connect to each other via Bluetooth communication, using an audio signal.

Another aspect of the present invention is to provide a Bluetooth communication method and system that enables Bluetooth devices to rapidly and intuitively connect to each other, thereby easily transmitting contents therebetween.

Another aspect of the present invention is to provide a Bluetooth communication method and system that enables Bluetooth devices to rapidly and intuitively connect to each other, thereby enhancing use convenience.

In accordance with an aspect of the invention, a Bluetooth communication method is provided. The method includes transforming, by a first Bluetooth device, authentication information required to establishes a Bluetooth communication connection into an audio signal, broadcasting the audio signal via a speaker of the first Bluetooth device, receiving, by a second Bluetooth device, the audio signal via a microphone of the second Bluetooth device, extracting, by the second Bluetooth device, the authentication information from the received audio signal, transmitting, by the second Bluetooth device, a Bluetooth communication connection request signal to the first Bluetooth device, using the extracted authentication information, transmitting, by the first Bluetooth device, a response signal to the second Bluetooth device, and establishing, when receiving the response signal, a Bluetooth communication channel between the first and second Bluetooth devices.

In accordance with another aspect of the invention, a Bluetooth communication system is provided. The system includes first and second Bluetooth devices. The first Bluetooth device transforms authentication information required to establish a Bluetooth communication connection into an audio signal, and broadcasts the audio signal. The second Bluetooth device receives the audio signal and extracts the authentication information from the received audio signal. The second Bluetooth device establishes a Bluetooth communication channel with the first Bluetooth device, using the extracted authentication information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms or words used in the following description and the claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following exemplary embodiments of the invention, the term "Bluetooth device" refers to a device that can support a Bluetooth communication function. It will be appreciated that the invention can be applied to all information communication devices, multimedia devices, and their applications, for example, mobile communication terminals, Personal Digital Assistants (PDAs), smartphones, personal computers, laptop computers, netbook computers, Portable Multimedia Players (PMPs), Play Station Pockets (PSPs), headsets, navigation systems, televisions, etc.

Figure 1:
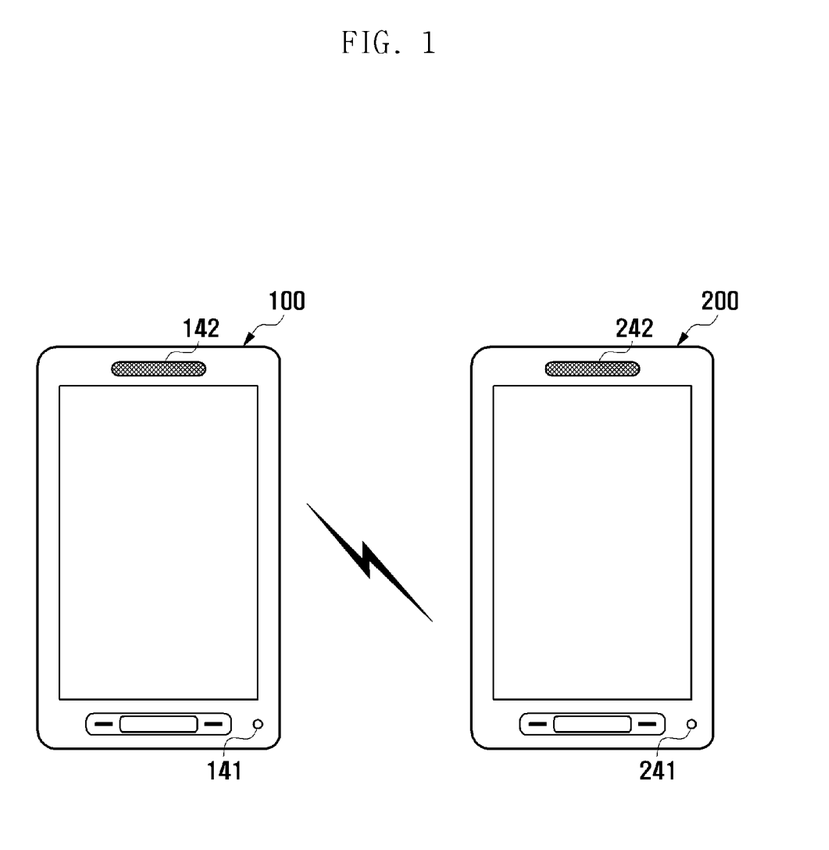
FIG. 1 illustrates a Bluetooth communication system according to an exemplary embodiment of the present invention.

FIG. 1 illustrates a Bluetooth communication system according to an exemplary embodiment of the present invention.

Referring to FIG. 1, the Bluetooth communication system includes a first Bluetooth device 100 and a second Bluetooth device 200. The first Bluetooth device 100 includes a microphone 141 and a speaker 142. Similarly, the second Bluetooth device 200 includes a microphone 241 and a speaker 242. The first 100 and second 200 Bluetooth devices can operate in a transmission or reception mode. In the following description, for the sake of convenience, it is assumed that the first Bluetooth device 100 operates in a transmission mode and the second Bluetooth device 200 operates in a reception mode.

The first Bluetooth device 100 is operated in a transmission mode according to a user's request, transforms authentication information (e.g., the unique address of a Bluetooth module, BT_ADDR, and a password), required to establish a Bluetooth communication connection, into an audio signal, and broadcasts the audio signal via the speaker 142. In an exemplary implementation, the first Bluetooth device 100 may mix the audio signal with another sound source signal or apply a masking effect to the audio signal, and may broadcast it. This is to prevent the audio signal from causing the user to feel unpleasant. When the first Bluetooth device 100 receives a Bluetooth communication connection request signal from the second Bluetooth device 200, it transmits the response signal thereto, and establishes a Bluetooth communication channel therewith. After that, the first Bluetooth device 100 transmits contents selected by the user (e.g., photographs, music files, video files, a phonebook, etc.) to the second Bluetooth device 200.

When the second Bluetooth device 200 is operated in a reception mode, it enables the microphone 241 and receives an audio signal broadcast from the first Bluetooth device 100. The second Bluetooth device 200 extracts authentication information, required to establishes a Bluetooth communication channel with the first Bluetooth device 100, from the received audio signal. The second Bluetooth device 200 can transmit a Bluetooth communication connection request signal to the first Bluetooth device 100, using the extracted authentication information. When the second Bluetooth device 200 receives the response signal from the first Bluetooth device 100, it can establish a Bluetooth communication channel with the first Bluetooth device 100. The second Bluetooth device 200 can receive contents from the first Bluetooth device 100 via the Bluetooth communication channel.

An exemplary Bluetooth communication system can rapidly and easily establish a Bluetooth communication channel between Bluetooth devices using an audio signal, without performing a conventional pairing process where a number of Bluetooth devices are searched and one of them is selected. Therefore, the system enhances user convenience. In addition, the system can also allow Bluetooth devices to easily transmit contents to each other.

Although the above described exemplary embodiment is implemented in such a manner that the first Bluetooth device 100 operates in a transmission mode and the second Bluetooth device 200 operates in a reception mode, it should be understood that the invention is not limited thereto. It will be noted that the first Bluetooth device 100 may operate in a reception mode and the second Bluetooth device 200 may operate in a transmission mode.

Figure 2:
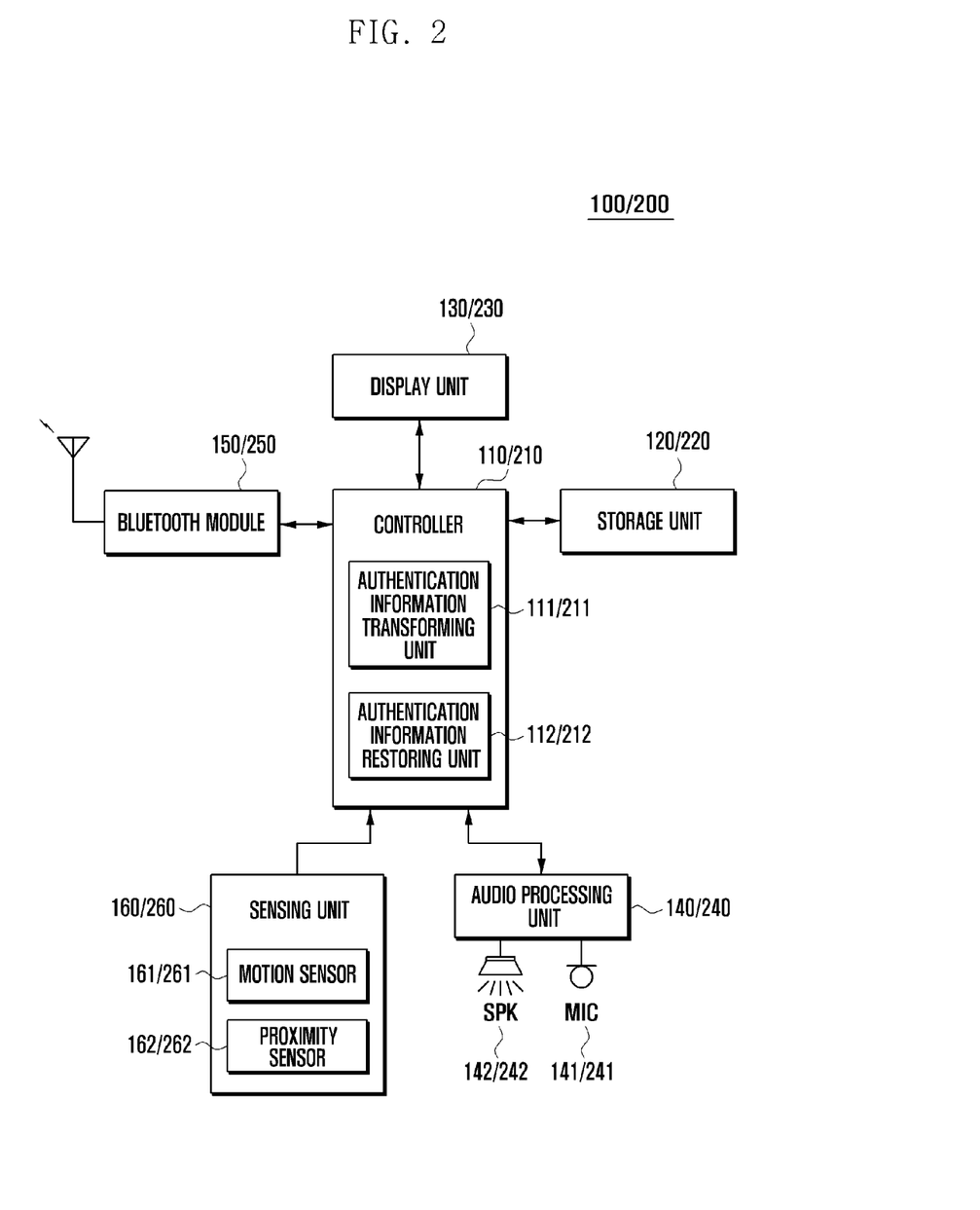
FIG. 2 illustrates a schematic block diagram of a Bluetooth device according to an exemplary embodiment of the present invention.

FIG. 2 illustrates a schematic block diagram of a Bluetooth device according to an exemplary embodiment of the present invention.

As shown in FIG. 2, the Bluetooth device may be a first 100 or second 200 Bluetooth device. The first 100 and second 200 Bluetooth devices are distinguished according to their operation mode, e.g., a transmission mode or a reception mode, and have the same components. Therefore, for the sake of convenience, the same components in the first 100 and 200 Bluetooth devices will be expressed by a singular term citing corresponding reference numbers using a slash (/).

Referring to FIG. 2, the first 100 and second 200 Bluetooth devices each include a controller 110/210, a storage unit 120/220, a display unit 130/230, an audio processing unit 140/240, a Bluetooth module 150/250, and a sensing unit 160/260.

The display unit 130/230 displays menus of the Bluetooth device 100/200 and information that is input by the user or provided to the user. The display unit 130/230 displays a variety of screens for the Bluetooth device 100/200, for example, an idle screen, a menu screen, a message writing screen, a call screen, etc. In an exemplary implementation, the display unit 130/230 can display a menu screen related to Bluetooth communication, a screen when Bluetooth communication is performed, a screen for displaying a message stating the failure in establishing a Bluetooth communication connection, etc. The display unit 130/230 may be implemented with a Liquid Crystal Display (LCD), an Organic Light Emitting Diode (OLED), an Active Matrix OLED (AMOLED), and the like. When the display unit 130/230 is implemented with a touch screen, it may also serve as an input mechanism (not shown).

The Bluetooth module 150/250 supports Bluetooth communication between the Bluetooth devices 100 and 200. The Bluetooth module 150/250 establishes a Bluetooth communication channel with other Bluetooth devices according to the control of the controller 110/210, thereby allowing the Bluetooth device 100/200 to transmit/receive data to/from other Bluetooth devices via the channel. The Bluetooth module 150/250 can support Hands-Free Profile (HFP) for hands free sets, HeadSet Profile (HSP) for headsets, File Transfer Profile (FTP) for file transfer, Cordless Telephone Profile (CTP) for cordless telephones, etc. When the Bluetooth device 100/200 is operated in a reception mode, the Bluetooth module 150/250 transmits a Bluetooth communication connection request signal to another Bluetooth device, using authentication information extracted from an audio signal received via a microphone 141/241 of the audio processing unit 140/240. After that, the Bluetooth module 150/250 receives the response signal from the other Bluetooth device.

When the Bluetooth device 100/200 is operated in a transmission mode, the Bluetooth module 150/250 receives a Bluetooth communication connection request signal from other Bluetooth device. In that case, the Bluetooth module 150/250 transmits the response signal to the other Bluetooth device. When Bluetooth communication is established between the Bluetooth device 100/200 and the other Bluetooth device, the Bluetooth module 150/250 of the Bluetooth device 100/200 transmits contents to the other Bluetooth device under the control of the controller 110/210.

The storage unit 120/220 stores an Operating System (OS) of the Bluetooth device 100/200, and applications for executing optional functions, such as an audio playback function, a photograph or video playback function, etc. The storage unit 120/220 also stores user data, contents (e.g., photographs, music files, video files) to be transmitted/received to/from the other Bluetooth device via the Bluetooth module 150/250, etc. The storage unit 120/220 also stores authentication information. The authentication information may be a unique address (BD_ADDR) of a Bluetooth module. The authentication information may include password information required when the Bluetooth device 100/200 establishes a Bluetooth communication connection. In an exemplary implementation, the storage unit 120/220 includes an application program for transforming the authentication information into an audio signal according to a preset transformation, and also an application program for inverse-transforming an audio signal into authentication information. The storage unit 120/220 may include Random Access Memory (RAM), Read Only Memory (ROM), flash memory, or a combination thereof. The storage unit 120/220 may include one or two integrated memory chips, for example, a Multi-Chip Package (MCP), etc.

The audio processing unit 140/240 transfers an audio signal to the speaker 142/242 or an audio signal, received via the microphone 141/241, to the controller 110/210. That is, the audio processing unit 140/240 converts an analog voice signal, received via the microphone 141/241, to a digital voice signal, and transfers it to the controller 110/210. The audio processing unit 140/240 also converts a digital voice signal into an analog voice signal and outputs it via the speaker 142/242. In addition, the audio processing unit 140/240 can also output, via the speaker 142/242, a key input sound, sound effects according to the execution of corresponding functions, audio sound when an audio file (e.g., an MP3 file) is played back, etc. In an exemplary implementation, when the Bluetooth device 100/200 is operated in a transmission mode, the audio processing unit 140/240 can output an audio sound, created by transforming the authentication information, to the speaker 142/242. Likewise, when the Bluetooth device 100/200 is operated in a reception mode, the audio processing unit 140/240 receives an audio signal via the microphone 141/241 and transfers it to an authentication information restoring unit 112/212 of the controller 110/210. The audio processing unit 140/240 can also output a sound effect indicating the failure in establishing a Bluetooth communication connection using an audio signal.

The sensing unit 160/260 senses motion of the Bluetooth device 100/200. The sensing unit 160/260 includes a motion sensor 161/261 and a proximity sensor 162/262. The motion sensor 161/261 creates a signal for requesting to execute a transmission mode to transmit contents. For example, when the user selects contents to be transmitted and performs a preset motion (e.g., a swing, a tilting, etc.) without operating any key, the motion sensor 161/261 senses the motion. In that case, the controller 110/210 can execute a transmission mode to transmit the selected contents. The motion sensor 161/261 may be implemented with an acceleration sensor, a gravity sensor, a geomagnetic sensor, etc. In another exemplary embodiment, the motion sensor 161/261 may be omitted in Bluetooth devices when they do not provide a function for transmitting contents via a user's motion.

The proximity sensor 162/262 refers to a sensor that is able to sense the approach and the presence of nearby objects without any physical contact. The proximity sensor 162/262 may be implemented with a magnetic proximity sensor, a ultrasonic proximity sensor, a photoelectric proximity sensor, an inductive proximity sensor, a capacitive proximity sensor, etc. In an exemplary implementation, the proximity sensor 261 of the first Bluetooth device 100 senses the approach of the second Bluetooth device 200, and the proximity sensor 262 of the second Bluetooth device 200 senses the approach of the first Bluetooth device 100. When the first 100 and second 200 Bluetooth devices are within a certain range, the proximity sensor 162/262 is used to determine the proximity so that they can connect to each other via Bluetooth communication using an audio signal. This is because the second Bluetooth device 200 in a reception mode cannot receive properly an audio signal in an environment where the level of external noise is relatively large. To address this problem, when the first 100 and second 200 Bluetooth devices detect that they are near each other (i.e., within a certain range via the proximity sensor 162/262), the first Bluetooth device 100 in a transmission mode activates the speaker 142 and the second Bluetooth device 200 in a reception mode activates the microphone 241.

The controller 110/210 controls operations of the Bluetooth device 100/200 and the signal flow between the components in the Bluetooth device 100/200. The controller 110/210 also processes data in the Bluetooth device 100/200. In an exemplary implementation, the controller 110/210 includes an authentication information transforming unit 111/211 and the authentication information restoring unit 112/212.

The authentication information transforming unit 111/211 transforms authentication information regarding the Bluetooth module 150/250 into an audio signal in a particular pattern when the Bluetooth device 100/200 is operated in a transmission mode. The authentication information transforming unit 111/211 can mix the transformed audio signal with another sound source signal or apply a masking effect to the transformed audio signal. This is to make the user feel more comfort from an audio signal output from the speaker 142 of the Bluetooth device 100 in a transmission mode.

The authentication information restoring unit 112/212 extracts authentication information regarding the Bluetooth module 150/250 from an audio signal that is received via the microphone 141/241 of the audio processing unit 140/240 when the Bluetooth device 100/200 is operated in a reception mode.

The controller 110/210 can control the Bluetooth module 150/250 to establish the Bluetooth communication connection between the Bluetooth devices 100 and 200 using the extracted authentication information. When the Bluetooth communication connection has been established, the controller 110/210 of the Bluetooth device 100/200 in a transmission mode can transmit contents to the opposite Bluetooth device 200/100 via the Bluetooth module 150/250. On the contrary, the controller 110/210 of the Bluetooth device 100/200 in a reception mode can receive contents from the opposite Bluetooth device 200/100 via the Bluetooth module 150/250. After contents have been transmitted or received, the controller 110/210 controls the display unit 130/230 or audio processing unit 140/240 to output a message or sound effect to inform the user that the process has been completed.

Although it is not shown in FIG. 2, the Bluetooth device 100/200 may selectively further include units having add-on functions as follows: an RF communication unit; a broadcast module for receiving and reproducing broadcasts; a camera module for photographing objects; an Internet communication module for performing communication via the Internet; etc. With the spread of digital convergence, although Bluetooth devices vary too greatly to list their modifications in this description, it will be easily appreciated by those skilled in the art that the other units equivalent to the above-listed units may be further included in the Bluetooth device of the invention.

Figure 3:
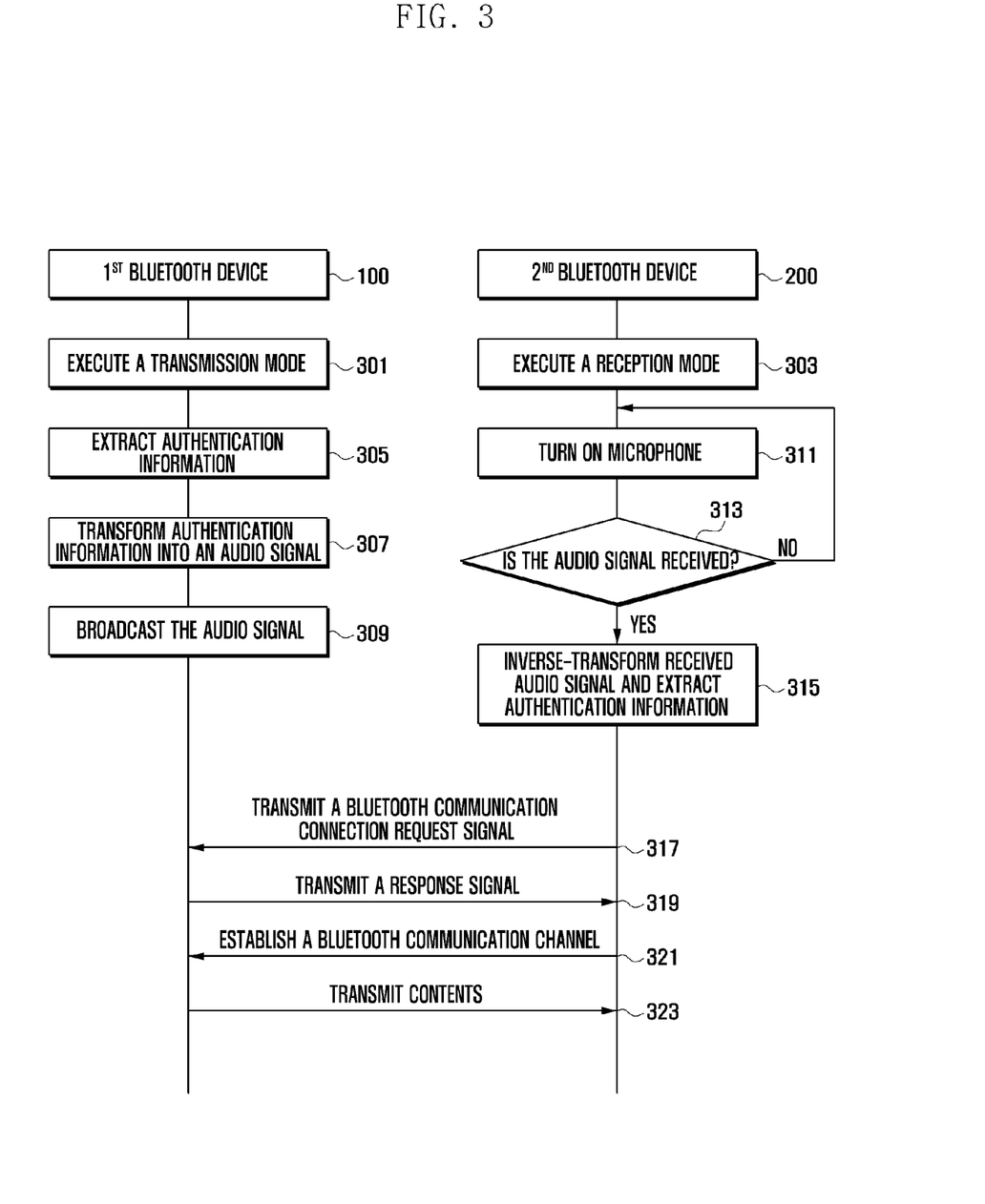
FIG. 3 is a flowchart illustrating a Bluetooth communication method in a Bluetooth communication system, according to an exemplary embodiment of the present invention.

FIG. 3 is a flowchart illustrating a Bluetooth communication method in a Bluetooth communication system, according to an exemplary embodiment of the present invention.

Referring to FIG. 3, the first Bluetooth device 100 operates in a transmission mode, according to an input signal created in the input unit (not shown) or a touch signal that occurs on the touch screen at step 301. Likewise, the second Bluetooth device 200 operates in a reception mode according to a signal created by the input unit or the touch screen at step 303. The transmission mode and reception mode can be executed via menus included in the first 100 and second 200 Bluetooth devices, respectively. Alternatively, the transmission mode can be executed when the user selects contents to be transmitted and makes a preset motion so that the motion sensor 161 of the first Bluetooth device 100 can sense it. For example, when the user selects contents to be transmitted and swings or tilts the first Bluetooth device 100 so that the motion sensor 161 can sense the swing or tilting motion, the first Bluetooth device 100 concludes that the user requested to transmit the selected contents, and can execute a transmission mode.

After executing the transmission mode, the first Bluetooth device 100 extracts authentication information, required to establish a Bluetooth communication connection, from the storage unit 120 at step 305. The authentication information includes a password and the unique address (BD_ADDR) of the Bluetooth module 150.

The first Bluetooth device 100 transforms the extracted authentication information into an audio signal at step 307, and broadcasts it via the speaker 142 of the audio processing unit 140 at step 309. Although it is not shown in FIG. 3, the first Bluetooth device 100 can activate the speaker 142 and broadcast the audio signal when the proximity sensor 161 senses the approach of the second Bluetooth device 200. This is to avoid wasting electric power that the first Bluetooth device 100 may consume by activating the speaker 142 and broadcasting the audio signal in a situation where the second Bluetooth device 200 in a reception mode cannot receive the audio signal. It is preferable that the first 100 and second 200 Bluetooth devices approach each other with the speaker 142 of the first Bluetooth device 100 facing the microphone 241 of the second Bluetooth device 200. In addition, the first Bluetooth device 100 can mix the audio signal with a preset sound source signal or a user's selected sound source signal or apply a masking effect to the audio signal. This is done to prevent the audio signal, transformed from the authentication information, from giving the user displeasure. To this end, the first Bluetooth device 100 includes an authentication information transforming unit 111.

Meanwhile, after executing the reception mode at step 303, the second Bluetooth device 200 activates the microphone 241 at step 311, and determines whether an audio signal with a particular pattern is received via the microphone 241 at step 313. When the second Bluetooth device 200 ascertains that an audio signal with a particular pattern is not received via the microphone 241 at step 313, it reverts to step 311 and again activates the microphone 241. On the contrary, when the second Bluetooth device 200 ascertains that an audio signal with a particular pattern is received via the microphone 241 at step 313, it extracts authentication information from the received audio signal at step 315. To this end, the second Bluetooth device 200 includes an authentication information restoring unit 212.

After that, the second Bluetooth device 200 transmits a Bluetooth communication connection request signal to the first Bluetooth device 100 via the Bluetooth module 250 using the extracted authentication information at step 317. The first Bluetooth device 100 receives the request signal and transmits the response signal to the second Bluetooth device 200 at step 319. The second Bluetooth device 200 receives the response signal, and establishes a Bluetooth communication channel with the first Bluetooth device 100 at step 321. The first Bluetooth device 100 transmits contents, requested for transmission by the second Bluetooth device user, to the second Bluetooth device 200 via the Bluetooth module 150 at step 323.

Figure 4:
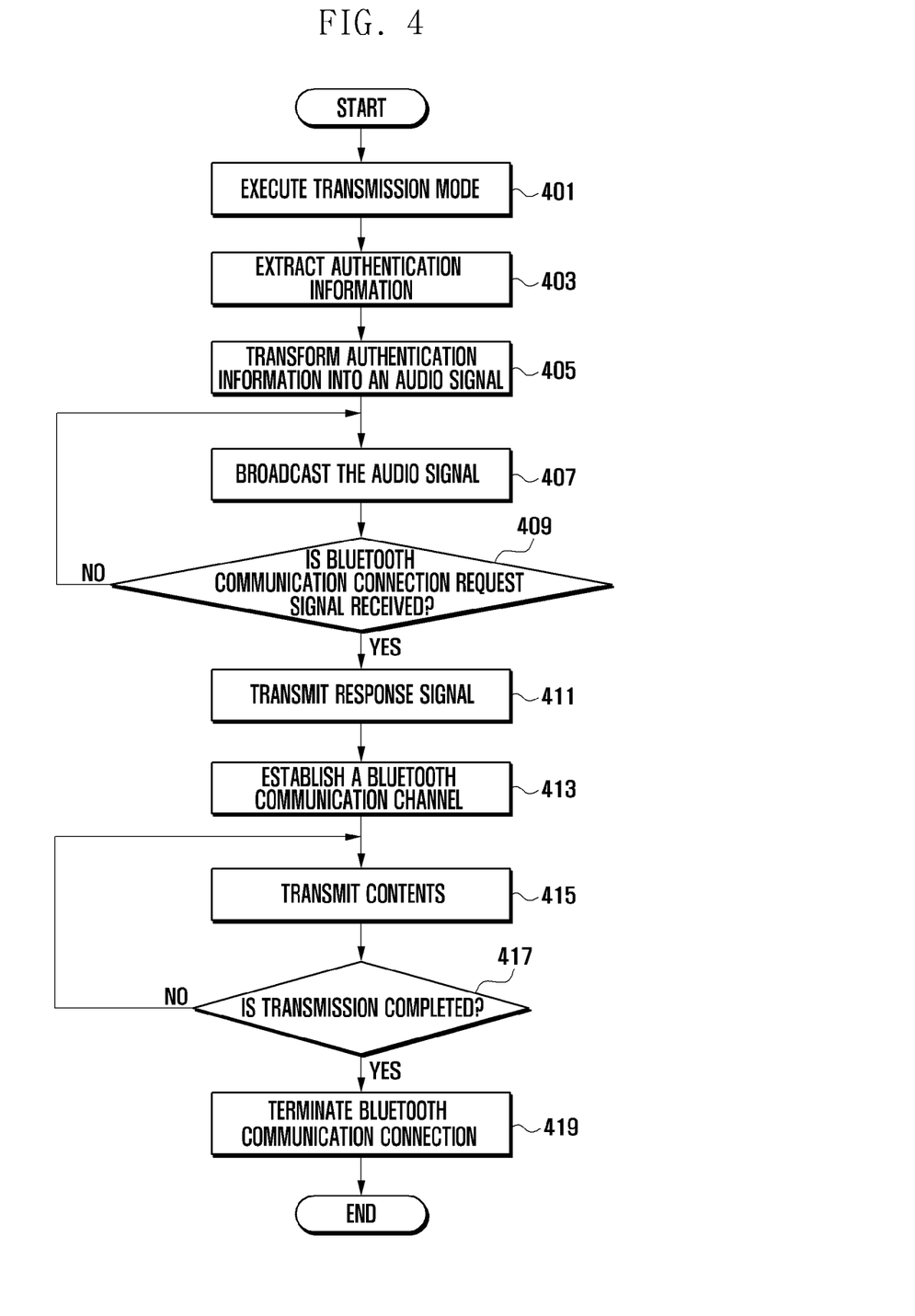
FIG. 4 is a flowchart illustrating a Bluetooth communication method in a first Bluetooth device operating in a transmission mode, according to an exemplary embodiment of the present invention.

FIG. 4 is a flowchart illustrating a Bluetooth communication method in a first Bluetooth device operating in a transmission mode, according to an exemplary embodiment of the present invention.

Referring to FIG. 4, the controller 110 of the first Bluetooth device 100 executes a transmission mode, according to an input signal created in the input unit (not shown) or a touch signal that occurs on the touch screen at step 401. In the transmission mode, the first Bluetooth device 100 can transmit contents to the second Bluetooth device 200. The transmission mode can be executed via a menu. Alternatively, the transmission mode can also be executed when the user makes a preset motion so that the motion sensor 161 of the first Bluetooth device 100 can sense it. For example, when the user selects swings or tilts in a particular direction the first Bluetooth device 100 so that the motion sensor 161 can sense the swing or tilting motion, the first Bluetooth device 100 can execute a transmission mode. On the other hand, the user selects contents to be transmitted and operates a transmission mode. Alternatively, the user operates a transmission mode via the menu included in the first Bluetooth device 100 and selects contents to be transmitted.

When the first Bluetooth device 100 operates in a transmission mode, the controller 110 extracts authentication information, required to establish a Bluetooth communication connection, from the storage unit 120 at step 403. The authentication information includes a unique address of a Bluetooth module. When the first Bluetooth device 100 is set with a password to establish a Bluetooth communication connection, the authentication information may include the password. The controller 110 transforms the extracted authentication information into an audio signal at step 405. To this end, the controller 110 includes an authentication information transforming unit 111. For example, the authentication information transforming unit 111 transforms the extracted authentication information into an audio signal with a particular pattern (e.g., an audio signal with 8 kHz of frequency) according to a preset transformation. Although it is not shown in FIG. 4, the authentication information transforming unit 111 may mix the transformed audio signal with a preset sound source signal or apply a masking effect to the transformed audio signal. This is done to prevent the audio signal, transformed from the authentication information according to a preset transformation, from giving the user displeasure. Since the transformation, mixing method, and masking process of the authentication information into an audio signal are well know to the person skilled in the art, their detailed description will be omitted in the application.

After transforming the authentication information into an audio signal at step 405, the controller 110 broadcasts the transformed audio signal via the speaker 142 of the audio processing unit 140 at step 407. In an exemplary implementation, the controller 110 may broadcast an audio signal when it receives a signal indicating the approach of the second Bluetooth device 200 from the proximity sensor 162. This is to prevent the first Bluetooth device 100 from broadcasting an audio signal even in a situation where the second Bluetooth device 200 cannot receive the audio signal. For example, when the first 100 and second 200 Bluetooth devices are spaced relatively far apart or the second Bluetooth device 200 cannot receive an audio signal because a noise level is high, broadcasting an audio signal may cause a waste of electric power for the first Bluetooth device 100. It is preferable that the first 100 and second 200 Bluetooth devices approach each other, with the speaker 142 of the first Bluetooth device 100 facing the microphone 241 of the second Bluetooth device 200, so that the second Bluetooth device 200 can receive a high level of audio signal, i.e., an audio signal with a higher Signal-to-Noise Ratio (SNR).

The controller 110 activates the Bluetooth module 150 and determines if a Bluetooth communication connection request signal is received from the second Bluetooth device 200 at step 409. When the controller 110 does not receive a Bluetooth communication connection request signal from the second Bluetooth device 200 at step 409, it returns to step 407 and broadcasts the transformed audio signal. Alternatively, although it is not shown in FIG. 4, when the controller 110 does not receive a Bluetooth communication connection request signal within a certain period of time, it displays, on the display unit 130, a message stating the failure in establishing a Bluetooth communication connection or outputs a preset sound effect via the speaker 142. On the contrary, when the controller 110 receives a Bluetooth communication connection request signal from the second Bluetooth device 200 at step 409, it transmits the response signal to the second Bluetooth device 200 via the Bluetooth module 150 at step 411, and establishes a Bluetooth communication channel therewith at step 413. Alternatively, although it is not shown in FIG. 4, when the controller 110 receives the Bluetooth communication connection request signal, it stops broadcasting the audio signal via the speaker 142.

When the Bluetooth communication channel has been established at step 413, the controller 110 transmits contents requested for transmission to the second Bluetooth device 200 via the Bluetooth module 150 at step 415. The controller 110 determines whether all contents have been transmitted at step 417. When the controller 110 ascertains that all contents have not been transmitted at step 417, it returns to step 415 and transmits contents to the second Bluetooth device 200. On the contrary, when the controller 110 ascertains that all contents have been transmitted at step 417, it terminates the Bluetooth communication connection at step 419. In that case, the controller 110 may display, on the display unit 130, a message stating that all contents have been transmitted or may output a sound effect via the speaker 142. Alternatively, when some contents have been transmitted, the controller 110 may display, on the display unit 130, a pop-up message asking whether the user desires to terminate the Bluetooth communication connection with the second Bluetooth device 200. When there are no contents to be transmitted, the user can select to terminate the Bluetooth communication connection. On the contrary, when there are contents to be transmitted, the user can select to retain the Bluetooth communication connection.

Figure 5:
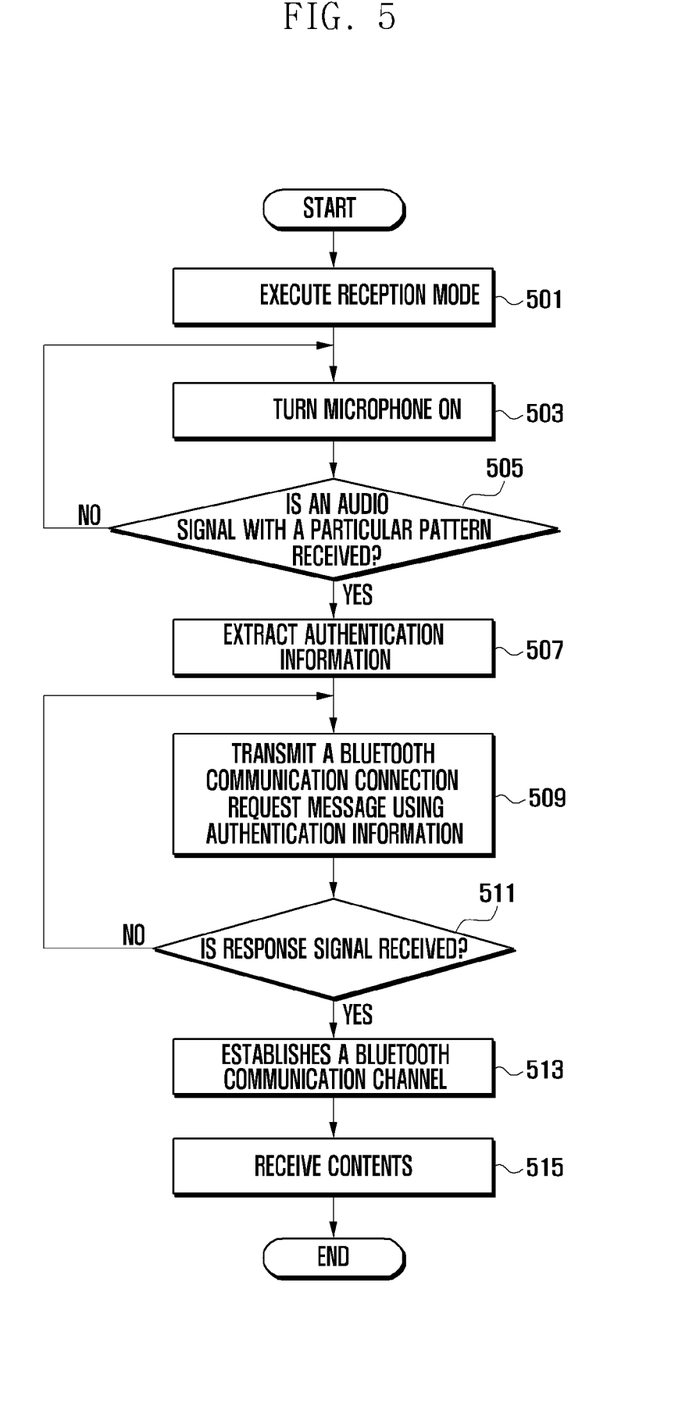
FIG. 5 is a flowchart illustrating a Bluetooth communication method in a second Bluetooth device operating in a reception mode, according to an exemplary embodiment of the present invention.

FIG. 5 is a flowchart illustrating a Bluetooth communication method in a second Bluetooth device operating in a reception mode, according to an exemplary embodiment of the present invention.

Referring to FIG. 5, the controller 210 of the second Bluetooth device 200 executes a reception mode at step 501. After that, the controller 210 activates the microphone 241 of the audio processing unit 240 at step 503, and determines if an audio signal with a particular pattern is received via the microphone 241 at step 505.

When the second Bluetooth device 200 does not receive an audio signal at step 505, the controller 210 returns to step 503 and again activates the microphone 241. On the contrary, when the second Bluetooth device 200 receives an audio signal at step 505, the controller 210 extracts authentication information, required to perform Bluetooth communication with the first Bluetooth device 100, from the received audio signal at step 507. To this end, the controller 210 includes an authentication information restoring unit 112.

When the authentication information has been extracted at step 507, the controller 210 transmits a Bluetooth communication connection request signal to the first Bluetooth device 100 using the extracted authentication information at step 509, and determines if a response signal is received from the first Bluetooth device 100 at step 511. When the second Bluetooth device 200 does not receive the response signal at step 511, the controller 210 returns to step 509. Alternatively, when the controller 210 does not receive the response signal within a certain period of time (e.g., 15 seconds), it displays, on the display unit 230, a message stating the failure in establishing a Bluetooth communication connection or outputs a preset sound effect indicating the failure in establishing a Bluetooth communication connection via the speaker 142. On the contrary, when the controller 210 receives the response signal, it establishes a Bluetooth communication channel with the first Bluetooth device 100 at step 513. When the Bluetooth communication channel has been established at step 513, the controller 210 receives contents transmitted from the first Bluetooth device 100 via the Bluetooth module 250 at step 515.

As described above, the Bluetooth communication method and system according to exemplary embodiments of the invention enables Bluetooth devices to rapidly connect to each other via Bluetooth communication, using an audio signal. Users can easily transmit contents from one Bluetooth device to another. In addition, the system and method does not require conventional processes, such as searching for a number of Bluetooth devices and asking users for selecting one of the searched Bluetooth devices, in order to establish a Bluetooth communication connection, thereby enhancing use convenience.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Bluetooth communication method, the method comprising:
    transforming, by a first Bluetooth device, authentication information required to establish a Bluetooth communication connection into an audio signal;
    outputting the transformed audio signal via a speaker of the first Bluetooth device;
    receiving a Bluetooth communication connection request signal from a second Bluetooth device receiving the transformed audio signal;
    transmitting, by the first Bluetooth device, a response signal corresponding to the Bluetooth communication connection request signal to the second Bluetooth device; and
    establishing a Bluetooth communication channel with the second Bluetooth device,
    wherein the authentication information required to establish a Bluetooth communication technique includes a unique address identifying the first Bluetooth device, and
    wherein the outputting of the transformed audio signal is performed when a proximity sensor of the first Bluetooth device senses that the second Bluetooth device is within a certain range of the first Bluetooth device in a transmission mode where contents are transmitted to the second Bluetooth device.

2. The method of claim 1, further comprising:
    transmitting, by the first Bluetooth device, contents selected by a user to the second Bluetooth device via the Bluetooth communication channel.

3. The method of claim 2, further comprising:
    determining if all contents selected by the user have been transmitted by the first Bluetooth device; and
    if it is determined that all contents selected by the user have been transmitted by the first Bluetooth device, terminating the Bluetooth communication channel and displaying an indication that all contents have been transmitted.

4. The method of claim 3, further comprising:
    if it is determined that all contents selected by the user have not been transmitted by the first Bluetooth device, displaying a message asking whether to terminate the Bluetooth communication connection with the second Bluetooth device.

5. The method of claim 1, wherein the transmission mode is executed when the user makes a preset motion so that a motion sensor can sense it.

6. The method of claim 1, wherein the transforming of the authentication information into the audio signal further comprises at least one of mixing the transformed audio signal with another sound source signal and applying a masking effect to the transformed audio signal.

7. The method of claim 1, wherein the transmitting, by the first Bluetooth device, of the response signal to the second Bluetooth device comprises determining that the request signal is received within a certain time.

8. The method of claim 1, wherein, after the outputting of the transformed audio signal via the speaker of the first Bluetooth device, the first Bluetooth device receives only the Bluetooth communication request signal from the second Bluetooth device before transmitting the response signal corresponding to the Bluetooth communication request signal.

9. A Bluetooth communication system, the system comprising:
    a first Bluetooth device configured to transform authentication information required to establish a Bluetooth communication connection into an audio signal, and configured to output the audio signal; and
    a second Bluetooth device configured to receive the audio signal, configured to extract the authentication information from the received audio signal, and configured to establish a Bluetooth communication channel with the first Bluetooth device, using the extracted authentication information,
    wherein the authentication information required to establish a Bluetooth communication technique includes a unique address identifying the first Bluetooth device, and
    wherein the first Bluetooth device includes a proximity sensor configured to sense that the second Bluetooth device is within a certain range of the first Bluetooth device, and
    wherein the first Bluetooth device activates the speaker and transmits the audio signal to the second Bluetooth device upon the proximity sensor sensing that the second Bluetooth device is within the certain range of the first Bluetooth device.

10. The system of claim 9, wherein the first Bluetooth device transmits contents selected by a user to the second Bluetooth device via the Bluetooth communication channel.

11. The system of claim 10, wherein the first Bluetooth device determines if all contents selected by the user have been transmitted, and, if it is determined that all contents selected by the user have been transmitted, terminates the Bluetooth communication channel and displays an indication that all contents have been transmitted.

12. The system of claim 11, wherein the first Bluetooth device, if it is determined that all contents selected by the user have not been transmitted, displays a message asking whether to terminate the Bluetooth communication connection with the second Bluetooth device.

13. The system of claim 9, wherein the first Bluetooth device transforms the authentication information into an audio signal, and broadcasts it in a transmission mode in which contents are transmitted to the second Bluetooth device.

14. The system of claim 9, wherein, when a proximity sensor of the second Bluetooth device senses that the first Bluetooth device is within a certain range of the second Bluetooth device, the second Bluetooth device activates the microphone and receives the audio signal from the first Bluetooth device.

15. The system of claim 9, wherein the first Bluetooth device determines if the request signal is received within a certain time prior to transmitting of the response signal to the second Bluetooth device.

16. The system of claim 9, wherein, after the first Bluetooth device outputs the audio signal, the first Bluetooth device receives only a Bluetooth communication request signal from the second Bluetooth device before the second Bluetooth device establishes the Bluetooth communication channel with the first Bluetooth device.

17. A Bluetooth communication method, the method comprising:
   receiving an audio signal transforming authentication information required to establish a Bluetooth communication connection via a microphone;
   extracting the authentication information from the received audio signal;
   transmitting a Bluetooth communication connection request signal using the extracted authentication information; and
   receiving a response signal in response to the Bluetooth communication connection request signal for establishing a Bluetooth communication channel with a Bluetooth device transmitting the response signal,
   wherein the authentication information required to establish a Bluetooth communication technique includes a unique address identifying the Bluetooth device and
   wherein the receiving of the audio signal comprises:
      sensing, by a proximity sensor, that the Bluetooth device transmitting the response signal is within a certain range;
      activating the microphone; and
      receiving the audio signal via the microphone.

18. The method of claim 17, further comprising receiving at least one content through the Bluetooth communication channel from the Bluetooth device transmitting the response signal.

19. The method of claim 17, wherein, after the extracting of the authentication information, only the Bluetooth communication connection request signal is transmitted before the receiving of the response signal from the Bluetooth device transmitting the response signal.

* * * * *